US012392279B1

(12) United States Patent
Verano, Jr.

(10) Patent No.: US 12,392,279 B1
(45) Date of Patent: Aug. 19, 2025

(54) ALTERNATIVE HEAT SOURCE FOR AN ENGINE

(71) Applicant: Leonard Verano, Jr., Livingston, NJ (US)

(72) Inventor: Leonard Verano, Jr., Livingston, NJ (US)

( * ) Notice: Subject to any disclaimer, the term of this patent is extended or adjusted under 35 U.S.C. 154(b) by 0 days.

(21) Appl. No.: 18/792,810

(22) Filed: Aug. 2, 2024

(51) Int. Cl.
*F02B 53/02* (2006.01)
*F02B 75/40* (2006.01)
*F02G 1/02* (2006.01)

(52) U.S. Cl.
CPC .............. *F02B 53/02* (2013.01); *F02B 75/40* (2013.01); *F02G 1/02* (2013.01); *F02G 2250/27* (2013.01); *F02G 2254/45* (2013.01); *F02G 2270/02* (2013.01); *F02G 2270/10* (2013.01)

(58) Field of Classification Search
CPC .. F02B 53/02; F02B 75/40; F02G 1/02; F02G 2250/27; F02G 2254/45; F02G 2270/02; F02G 2270/10
See application file for complete search history.

(56) References Cited

U.S. PATENT DOCUMENTS

2013/0183184 A1* 7/2013 Feustle ..................... F04C 2/00
418/191

FOREIGN PATENT DOCUMENTS

| | | | | | |
|---|---|---|---|---|---|
| CN | 102287347 | B | * | 6/2013 | |
| CN | 106150936 | A | * | 11/2016 | |
| CN | 106704125 | A | * | 5/2017 | |
| CN | 115333450 | A | * | 11/2022 | |
| NZ | 574674 | A | * | 4/2011 | ............... F02G 1/02 |
| PL | 222471 | B1 | * | 7/2016 | |

* cited by examiner

*Primary Examiner* — Audrey B. Walter
(74) *Attorney, Agent, or Firm* — Michael J. Brown

(57) ABSTRACT

An alternative heat source for an internal combustion engine with an elongated compartment with first and second ends, a directed energy device capable of sending a pulse of photonic energy to a focal point within the first end of the compartment, an intake allowing for the entry of a gas into the the elongated compartment, an exhaust allowing for the exit of the gas from the elongated compartment, and a piston capable of moving within the elongated compartment between the first and second ends. The pulse of photonic energy at the focal point heats the gas and causes a corresponding expansion of the gas in the elongated compartment, driving the piston toward the second end of the elongated compartment, where the piston movement can be translated into motive force. The same principle can work with a rotary chamber, or a dual chambered linear system.

15 Claims, 4 Drawing Sheets

ALTERNATIVE HEAT SOURCE FOR AN ENGINE

FIELD OF INVENTION

The invention is in the field of combustion engines used to power vehicles, as well as for general power generation.

BACKGROUND

The internal combustion engine and its main systems has not changed significantly in the last 100 years or so. There have been many improvements, but we are still stuffing a dirty and explosive fuel into a confined space and detonating it through the use of electric sparks or ultra high compression, such as diesel. An internal combustion engine is a type of heat engine that converts the chemical energy stored in fuel into mechanical energy.

The main components of an internal combustion engine are: at least one cylinder with a combustion chamber, a spark plug in the combustion chamber, an intake valve to allow for the entry of a fuel and air mixture into the combustion chamber, an exhaust valve to allow for the release of combustion gases from the combustion chamber, a piston that moves within the cylinder, and a crankshaft driven by the piston's movement to translate the linear motion of the piston into rotational motion.

The most common internal combustion engine in use today is a reciprocating piston engine, otherwise known as a "Four-Stroke" engine, as shown in FIG. 2. A more historical name would be an "Otto Cycle Engine," called this in honor of the inventor Nikolaus Otto, and invented in 1876. This type of engine has a cycle of four movements of the piston. The first movement is called the "Intake Stroke" 2001. The Intake Stroke 2001 reduces the vacuum pressure inside the cylinder by moving the piston downward with the intake valve in the open position. The reduction in pressure draws a mixture of fresh cool air mixed with gasoline vapor into the cylinder.

The next movement is called the "Compression Stroke," where the piston moves up, while simultaneously the intake valve rapidly closes, sealing the cylinder. The piston continues to move upward, compressing the gaseous mixture. This movement greatly increases the pressure within the cylinder to a high level of approximately 125 pounds per square inch.

The next movement in the cycle is called the "Power Stroke," where the piston gets almost all the way to the top of the cylinder, and the gaseous mixture is almost at its maximum pressure. At this point, an electric spark is created in the cylinder by the spark plug. This spark causes a violent explosion of the gaseous mixture, greatly increasing the pressure in the cylinder over and above the pressure level before the spark. The pressure from the explosion may go as high as five hundred pounds per square inch. The diameter of a cylinder in a common V8 engine is four inches, so the 500 pounds per square inch of pressure is approximately 6283 pounds over the surface area of the piston (4 inch diameter times II times 500 pounds per square inch). This violent expansion of the compressed gases trapped in the cylinder forces the piston to move, thereby causing the rotational movement of the crankshaft. The engine now has mechanical energy to rotate the crankshaft, providing power to the engine and any attached systems. As the engine is providing its own power, the continued rotation of the crankshaft now forces the piston upward for the final movement in the cycle, called the "Exhaust Stroke." In The Exhaust Stroke, the air and combustion by-products exit the cylinder through an exhaust valve and are now outside of the engine. Having the air and combustion by-products leave the cylinder allows for the entry of fresh air in the Intake Stroke. The four movements of the cycle repeat to keep the engine running.

Until now fossil fuels have been solely used and needed to create a heat pulse at the top of the Compression Stroke to cause the Power Stroke. This is the driving expansive force that causes the compressed air in the cylinder to violently expand and force the piston downward in the sealed cylinder. This creates mechanical motion coupled by the crankshaft which then converts it to rotational movement and usable energy. A main drawback with the fossil fuel driven force is that only one fuel charge or heat pulse can be generated per Power Stroke. The heat pulse produced by conventional fossil fuel ignition is approximately 1 BTU or 1055 joules.

The standard four-cycle engine spark repetition time rate formula is t=120/(N*RPM) where t is seconds and N is number of cylinders. A V8 at 6000 RPM has 120/48000=.0025 seconds between repeating standard ignition system sparks. This is 2.5 milliseconds between sparks, or 1/.0025=400 sparks per second.

All kinds of tricks and techniques have been used to force more fuel and air into the cylinder within the tiny window of opportunity of the Intake Stroke. Superchargers, turbochargers, fuel injectors, multiple carburetors, and similar devices have been used to increase the efficiency of the overall cycle, and in particular, the Power Stroke, to a much higher level. One known method involves the introduction of nitrous oxide to the cylinder to change the chemical composition of the air and gas mixture. However, the efficiency level of the gas combustion cycle is still stuck around 20 to 25 percent. At least 75 percent of the heat energy that is produced during combustion escapes as waste heat!

Even in today's computer-controlled more efficient engines have not made much of a difference in power efficiency.

A reason that the current fossil fuel driven engines are so inefficient is that during the Power Stroke the piston moves downward in the cylinder as it should. However, as the piston moves downward, this movement increases the cubic volume of the combustion chamber, and as the volume of the combustion chamber increases, the usable pressure in the cylinder decreases. This is a direct result of the Ideal Gas Law which describes the mathematical relationship between temperature (T), volume (V) and pressure (p) of a quantity (n) of a gas, in the formula $pV=nRT$, where R is a constant as applied to the particular gas.

Following the Ideal Gas Law, after the gaseous mixture in the cylinder is compressed at the Compression Stroke, the explosion caused by the spark increases the temperature, which in turn raises the pressure of the gas in the defined volume of the cylinder, causing the driving force for the Power Stroke.

It has long been desired to find a replacement for the use of fossil fuels to power vehicles.

SUMMARY

The invention provides the use of a directed energy device, such as a laser, that heats air within a closed chamber, replacing the need for fossil fuel in combustion engines. The focal point of the directed energy device (laser) is within the cylinder, focused to a convergent point within the cylinder, specifically the combustion chamber. The energy provided by the directed energy device at the focal point produces a rapid increase in the temperature of the compressed air within the cylinder, without the need for an additional combustion component, such as fuel. This rapid increase in temperature mimics the effect of the spark-induced explosion of fuel and air, but at a faster speed and higher temperature than conventional combustion engines, and without any fuel by-products or residue.

A laser is capable of pulsing multiple times throughout the duration of each power stroke. This enables the creation of a constant high pressure throughout the power stroke, including the possibility of increasing pressure within the cylinder, when the piston is moving downward and the volume within the cylinder increases.

DETAILED DESCRIPTION

Figure 1:
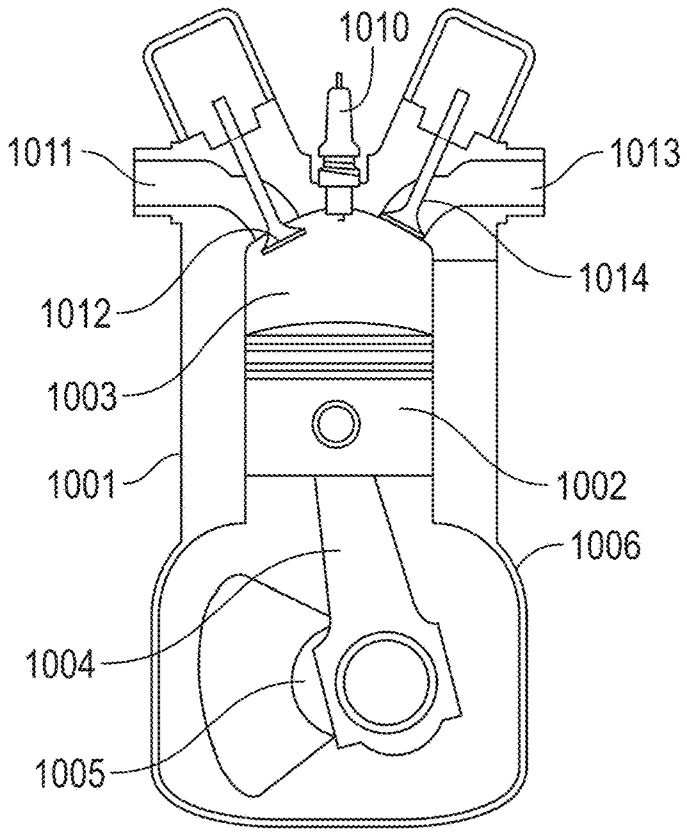
FIG. 1 (Prior Art)
FIG. 1 is a view of a prior art internal combustion engine cylinder.

The invention preferably consists of a directed energy device 100 capable of focusing light energy at a particular focal point 110 within a combustion chamber 210 of a engine cylinder 200.

Directed energy source 100 is capable of generating a high energy pulse at focal point 110. Focusing device 120 may be provided to assist in targeting the energy pulse to the desired focal point. It is anticipated that during the course of a full cycle, focal point 110 may not be fixed and may move within combustion chamber 210. Accordingly, focusing device 120 is preferably capable of moving the focal target of the energy pulse to a desired focal point 110, during the operation of the directed energy device.

The cylinder 200 has an intake port 211, an intake valve 212, an exhaust port 213 and an exhaust valve 214. Air 250 enters the combustion chamber 210 through intake port 211, where intake valve 212 opens and closes intake port 211. In a preferred embodiment, fresh air enters through intake port 211, but recycled air may also be used. Intake port 211 may be connected to ambient air, or may be connected to a pressurized air or gas supply. Exhaust valve 214 opens and closes exhaust port 213, allowing for the exit or release of air 253 from combustion chamber 210.

Figure 3:
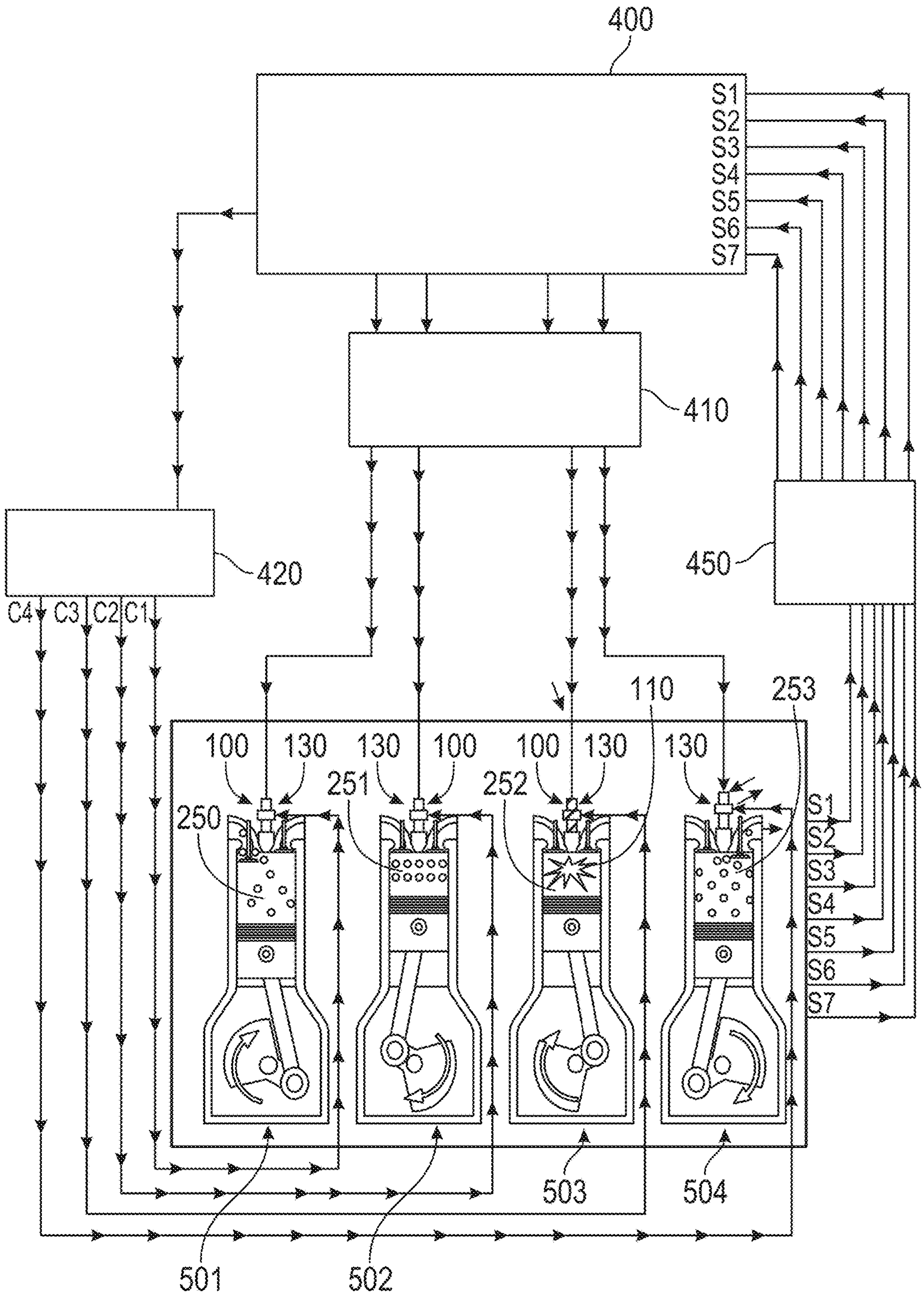
FIG. 3 is plan view of the present invention
Figure 4:
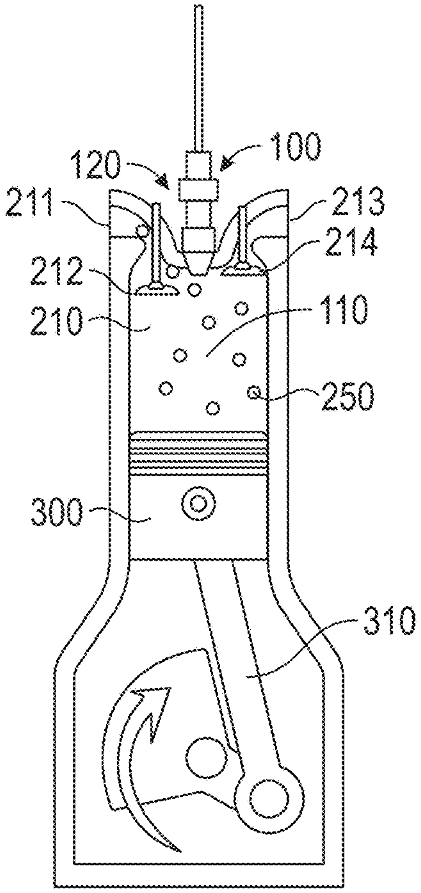
FIG. 4 is a plan view of a single cylinder of the present invention.

As shown in FIG. 3 at stage 501, air (or any gas) 250 enters combustion chamber 210, with the piston 300 in a lowered position. In stage 502, the piston 300 moves upward, and with intake valve 212 and exhaust valve 213 closed, the upward movement of piston 300 compresses the air in combustion chamber 210, resulting in compressed air 251. At the initial start of the system, external or stored energy, such as a battery, may be required to cause the upward movement of piston 300, but after an initial cycle of the system, energy will be available to drive piston 300 upward.

At stage 503, directed energy source 100 sends a pulse of energy to focal point 110, causing a rapid heating of the compressed air in combustion chamber, converting that air to heated air 252. The heated air 252 and corresponding increased pressure drives piston 300 downward, and the movement of the piston drives crankshaft 310, similar to how prior art internal combustion engines operate. During stage 503, directed energy source 100 may send additional pulses of energy to focal point 110, thereby increasing the pressure within combustion chamber 210, and increasing the power of the downward stroke of piston 300.

At stage 504, exhaust valve 214 opens, allowing for the release of heated air 253 through exhaust port 213. Piston 300 moves upward into combustion chamber 210, urging heated air 253 from combustion chamber 210. Before piston 300 reaches its highest point in combustion chamber 210, exhaust valve 214 closes and intake valve 212 opens, allowing for cooler air to enter combustion chamber 210. The operation of the intake and exhaust valves relative to the movement of piston 300 is similar to the operation of prior art internal combustion engines.

Figure 2:
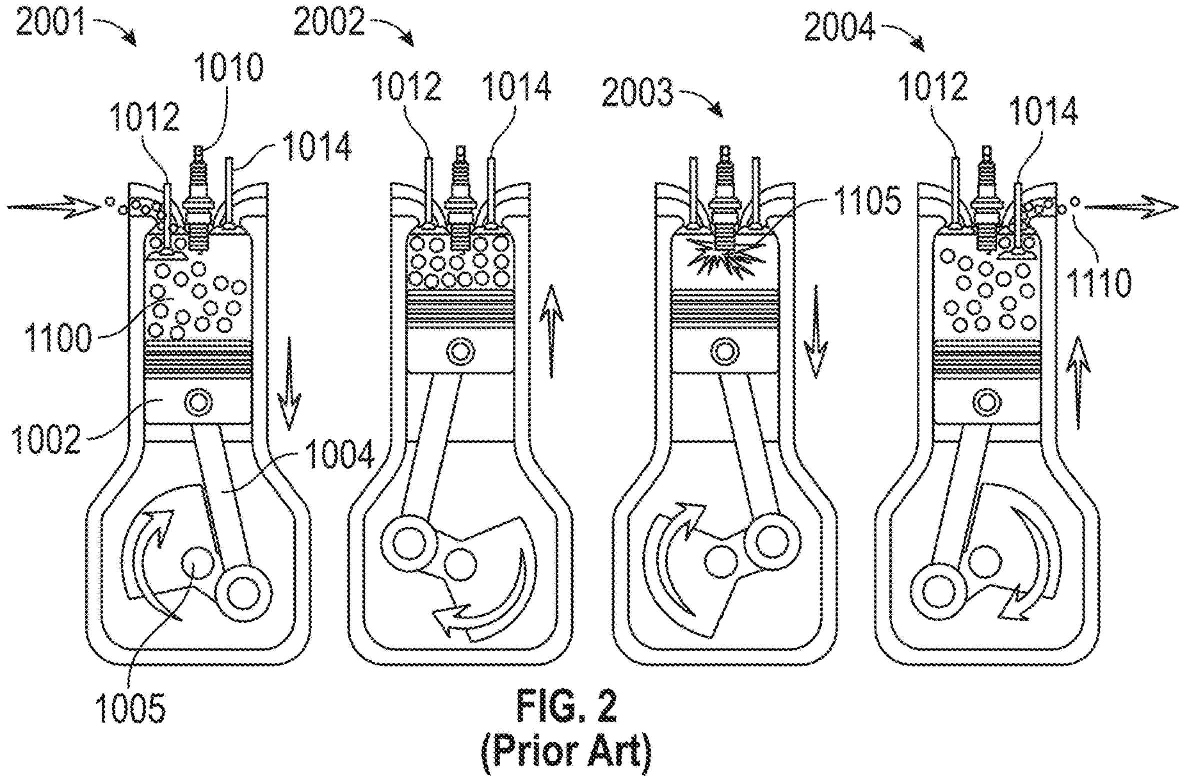
FIG. 2 (Prior Art)
FIG. 2 is a view of a prior art internal combustion engine, showing the four stroke cycle.

FIGS. 1 and 2 show a prior art internal combustion engine cylinder 1001 for comparison. An air and combustible fuel mixture enters the combustion chamber 1003 through intake port 1011 at stage 2001 controlled by intake valve 1012. At stage 2002, piston 1002 moves upward within combustion chamber 1003, driven by connecting rod 1004 and crankshaft 1005 within crankcase 1006. At stage 2003, spark plug 1010 initiates combustion of the air and fuel mixture, where the combustion 1105, drives piston 1003 downward within combustion chamber 1003. At stage 2004, exhaust gases exit through exhaust port 1013, controlled by exhaust valve 1014.

Ideally, the air or gas 250 that enters the combustion chamber is not heated, or is at a temperature such that upon the directed energy pulse will allow for a significant increase in temperature and accompanying increase in pressure. To the extent that a recycling loop for use of the air connects the exhaust port 213 with intake port 211, it is preferred that a cooling element be provided to lower the temperature of the air.

Piston 300 moves in a linear manner within cylinder 200, with a first position closer to the focal point 110 and a second position away from focal point 110. Movement of the piston 300 drives crankshaft 310, similar to how internal combustion engines operate, providing mechanical force to be used elsewhere.

A preferred embodiment uses fiber lasers as the directed energy source 100 because of their incredible output power to input power ratio. This type of laser is made internally in fiber optic cables. Cables of large lengths can be spooled onto a roll making them not only compact but also vibration resistant and easier to cool. Fiber lasers can create huge power amplification levels due to their technical construction. A fiber laser stores up many smaller pulses of energy, similar to the winding of a spring, and then releases the pulses in rapid succession. The real-world effect is as though one giant powerful pulse has been emitted.

While the preferred embodiment uses as much of existing engine structure as possible, including the use of the spark plug opening into the cylinder, there could be alternative entrance points into the cylinder, which do not currently exist in fuel driven engines.

One way of calculating a pulsed laser's power is by the formula: Pulse energy (J)=Average power (W)/repetition rate (Hz). The power of the directed energy device used in the present invention must be high enough to cause rapid heating of air, specifically at a single point.

The directed energy beam is preferably shaped or focused in order to provide the combustion chamber in the cylinder with effective energy at a particular focal point. The focus of the directed energy beam can be modified or adapted through the use of a focus device 120. As noted, pulsed lasers are preferred to continuous mode lasers for the invention, to limit wasted energy, but the invention is not limited to a particular type or mode of directed energy source, or frequency of the emitted energy. It is well known that lasers can generate pulses of hundreds of watts of power focused in a small spot.

The technology already exists to focus the energy into the ever-changing length and complex shape of the air space within the cylinder. Starting with a close focal point between the cylinder head and the top of the piston, the goal would be to maintain a focal point in a central position within the air space. As the piston moves away from the combustion chamber, the focal length is gradually increased to follow the piston as it moves downward. This is preferably accomplished to insure the most optimal point of injecting heat into the center mass of the quickly changing air space. This will also insure even heat absorption in the expanding air mass. Adaptive optics in focusing device 120 can control and shape the beam. Focus controller 130 may provide control of focusing device 120 in a preferred embodiment.

The focusing technology envisioned for focusing device 120 was developed for use in earth-based telescopes, to correct the distortion in the image caused by looking through the atmosphere into outer space. It may use an electrical signal applied to the lens by a microprocessor. This type of lens is a malleable device that physically changes its shape to correctly shape and focus the light energy passing through the lens. The microprocessor controls a feed-back loop that constantly monitors the clarity of the image. It then sends corrective electronic signals to the adaptive lens. This will insure the correct shape and focal point of the laser beam in real time. The actual focusing device 120 would be mounted on each engine cylinder, but controlled by at least one focus controller 130.

This type of technology is already being used in commercially available systems, such as laser cleaning machine that uses a shape changing laser beam to clean rusty surfaces without the need to physically grind the surface.

In a preferred embodiment, a plurality of sensors S1 to S7 would detect and monitor various characteristics of the operating cylinder and transmit such characteristics to a controller 400, which controller provides adjustments to the operation of the operating cylinder, directed energy source, and focusing device. Many of the monitoring systems that would be required by a laser driven engine are already in use in other systems and are known to those skilled in the art. Examples of the types of sensors that could be used include barometric sensors, air temperature sensors, engine temperature sensors, crankshaft position sensors, camshaft position sensors, air intake flow sensors, among others. Many of these sensors S1 to S7 would produce data to be provided to controller 400 and sensor driver 450. Controller 400 could then instruct focusing controller 130 and power source 140 to tailor the directed energy device's output through control signals C1 to C4. This control would allow for optimization of the engine's needs in an ever-changing environment and operating load. Sensors S1 to S7 such as crankshaft sensors, camshaft sensors, throttle position sensors and others could inform controller 400 of mechanical position and speed of various engine components.

As is known in the art, such sensors S1 to S7 may also require the use of driver circuits to ensure accurate measurements of the systems being monitored, and prevent the degradation of the accuracy of an information signal as it passes from a sensor S1 to S7 to the controller 400.

This system takes advantage of electronic components that are in widespread use and are known in the art. All of the electronic components that I have mentioned are applied in ways that are within their respective performance characteristics.

I believe that using this type of heat injection, totally free from burning fossil fuels, would positively impact global environmental health. This would drastically reduce pollution output throughout the world and allow us to continue our love affair with the thermally driven pneumatic engine.

Figure 5:
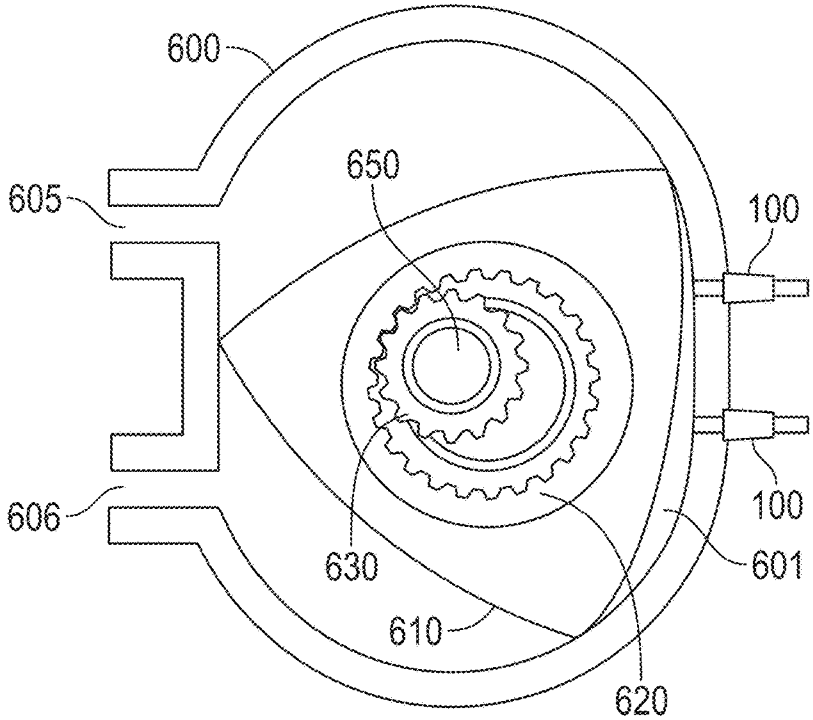
FIG. 5 is a plan view of an alternate embodiment of the present invention.
Figure 6:
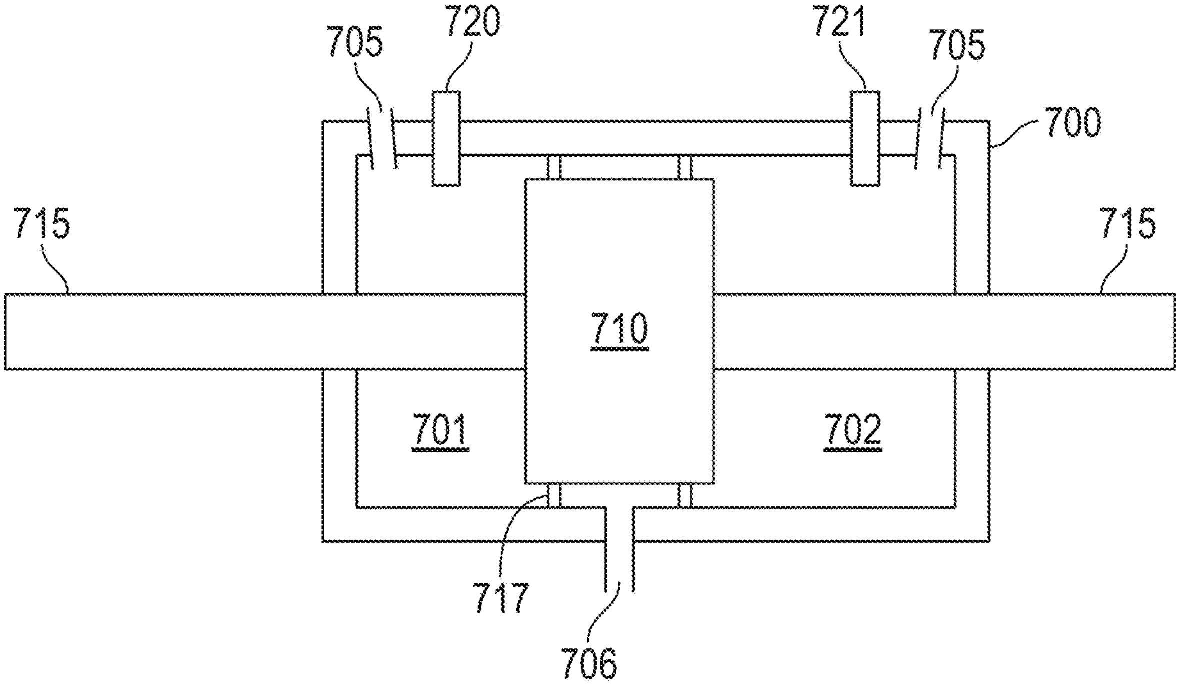
FIG. 6 is a plan view of another alternate embodiment of the present invention.

There are other kinds of engines that use the same expanding gas principle as the reciprocating piston with its spark plug, cylinder, and piston. One of these engine types is the eccentric rotary engine, or Wankel engine, as shown in FIG. 5. In prior art systems, the same mixture of fresh air and an explosive fuel is used. In the eccentric rotary engine, a triangular rotor is placed in a semi-circular chamber and is made to rotate by exploding the air contained at certain points of the surrounding circular enclosure. The rotor includes an internal gear ring, and as the rotor turns, the internal gear ring drives a gear attached to an output shaft, causing the rotation of the output shaft which is then used to drive other parts of the vehicle.

As shown in FIG. 5, directed energy devices 100 can be used to inject high heat pulses into a rotary chamber 600, causing the rapid expansion of air within the rotary combustion chamber 601 to drive the rotor 610, but without the use of a fuel. As with the prior art rotary engine, the movement of the rotor 610 causes the rotation movement internal gear ring 620, which causes the rotation of the output shaft gear 630, thereby causing rotation of output shaft 650. Air enters through intake port 605, and heated air exits through exhaust port 606.

Use of a directed energy in an eccentric rotary engine can address some of known inefficiencies of the internal combustion eccentric rotary engine, such as poor fuel efficiency and higher emissions when compared to reciprocating piston internal combustion engines. Further, the computer processor control of the directed energy devices bring a greater efficiency to the eccentric rotary engine.

Another embodiment of the invention provides an elongated chamber 700 with two ends and a piston 710 moving between the two ends. A directed energy device (720, 721) is located at each end, each focused at a focal point (701, 702) within an end of the elongated chamber. An air intake 705 is preferably located at each end, and an exhaust 706 may be located centrally. The directed energy devices alternate their respective firing pulses to drive the piston back and forth within the elongated chamber. Piston extensions 715 preferably extend out of the elongated chamber 700 to provide motive force to external systems. Similar physical systems, without the use of directed energy devices, are implemented in locomotives and power plants.

High speed lasers operate at a much faster rate than even the rapid movement of internal engine parts, pistons, valves, etc. in a conventional combustion engine. When an automobile is traveling at 60 miles per hour, the pistons within the engine are moving up and down within the cylinders at approximately 55 times per second. In contrast, the speed of directed energy devices such as lasers can pulse many millions of times per second.

While the initial scope of the present invention is directed to replace a conventional internal combustion engine for motor vehicles, the invention may also be used as part of an engine for boats, airplanes, helicopters, or even power generation systems.

While certain novel features of the present invention have been shown and described, it will be understood that various omissions, substitutions and changes in the forms and details of the device illustrated and in its operation can be made by those skilled in the art without departing from the spirit of the invention.

I claim:

1. An alternative heat source for an internal combustion engine comprising:
   - an elongated compartment with a first end and a second end;
   - a directed energy device with a focal point within the first end of the compartment, the directed energy device capable of sending a pulse of photonic energy to the focal point;
   - a computer processor configured to control the directed energy device;
   - an intake into the first end of the elongated compartment, the intake allowing for the entry of a gas into the first end of the elongated compartment;
   - an exhaust from the first end of the elongated compartment, the exhaust allowing for the exit of the gas from the first end of the elongated compartment;
   - a piston capable of moving within the elongated compartment between the first and second ends; and
   - where the pulse of photonic energy at the focal point is capable of heating the gas and causing a corresponding expansion of the gas in the elongated compartment, driving the piston toward the second end of the elongated compartment.

2. The alternative heat source for an engine of claim 1, further comprising:
   - means for translating movement of the piston into motive force.

3. The alternative heat source for an engine of claim 1, further comprising:
   - a focusing control for the directed energy device.

4. The alternative heat source for an engine of claim 3, further comprising:
   - a computer processor configured to control the focusing control.

5. The alternative heat source for an engine of claim 1, where the computer processor is configured to instruct the directed energy device to fire a plurality of pulses while the piston is at the first end of the compartment.

6. The alternative heat source for an engine of claim 1, further comprising:
   - an intake valve configured to control the intake; and
   - an exhaust valve configured to control the exhaust.

7. The alternative heat source for an engine of claim 1, further comprising:
   - a sensor within the elongated compartment, the sensor capable of detecting at least one of temperature, pressure, and vibration; and
   - a signal transmitter between the sensor and the computer processor.

8. The alternative heat source for an engine of claim 1 where the directed energy device is a laser.

9. An alternative heat source for an engine comprising:
   - an elongated compartment with a first end and a second end;
   - a laser with a focal point within the first end of the compartment, the laser capable of sending a pulse of photonic energy to the focal point;
   - an intake into the first end of the compartment, the intake allowing for the entry of a gas into the first end of the compartment;
   - an exhaust from the first end of the compartment, the exhaust allowing for the exit of the gas from the first end of the compartment;
   - a piston capable of moving within the compartment between the first and second ends;
   - a crankshaft for translating linear movement of the piston into rotational movement;
   - where the engine is configured to receive a pulse of photonic energy from the laser to provide energy to the gas within the first end of the compartment, increasing the temperature of the gas and causing the expansion thereof, and where the expansion of the gas causes the piston to move from the first end of the compartment toward the second end of the compartment.

10. The alternative heat source for an engine of claim 9, further comprising:
   - means for continuing the movement of the crankshaft to cause the piston to return to the first end of the compartment.

11. An alternative heat source for an engine comprising:
   - an engine compartment;
   - a first directed energy device with a first focal point within the engine compartment, the first directed energy device capable of sending a pulse of photonic energy to the first focal point;
   - a computer processor configured to control the first directed energy device;
   - a first intake into the engine compartment, the first intake allowing for the entry of a gas into the engine compartment;
   - an exhaust from the engine compartment, the exhaust allowing for the exit of the gas from the engine compartment;
   - where the pulse of photonic energy at the first focal point is capable of heating the gas and causing a corresponding expansion of the gas in the engine compartment;
   - a movable body within the engine compartment;
   - means for translating movement of the movable body into motive force;
   - where the movable body is configured to move due to the expansion of gas in the engine compartment.

12. The alternative heat source for an engine of claim 11, where the movable body is a piston and the means for translating movement of the movable body is a crankshaft.

13. The alternative heat source for an engine of claim 11, where the movable body is a rotor and the means for translating movement of the movable body is comprised of a first gear within the rotor and a second stationary gear driven by rotation of the first gear.

14. The alternative heat source for an engine of claim 11, further comprising:
   - a second directed energy device with a second focal point within the engine compartment, the second directed energy device capable of sending a pulse of photonic energy to the second focal point; and
   - a second intake into the engine compartment, the second intake allowing for the entry of a gas into the engine compartment.

15. The alternative heat source for an engine of claim 14, where at least one of the first and second directed energy device is a laser.

* * * * *